(12) United States Patent  
Veltrop et al.

(10) Patent No.: US 6,415,934 B1
(45) Date of Patent: Jul. 9, 2002

(54) FOOD PRODUCT COOKING BASKET

(75) Inventors: Loren J. Veltrop, Deerfield; Bradley E. Rogers, Elburn; Eugene L. DiMonte, Aurora, all of IL (US)

(73) Assignee: Prince Castle Inc., Carol Stream, IL (US)

( * ) Notice: Subject to any disclaimer, the term of this patent is extended or adjusted under 35 U.S.C. 154(b) by 0 days.

(21) Appl. No.: 09/723,075

(22) Filed: Nov. 27, 2000

(51) Int. Cl.[7] ................................................ A47F 5/00
(52) U.S. Cl. ................ 211/85.4; 150/181.1; 150/133.5; 99/416; 220/486
(58) Field of Search .......................... 211/150, 133.5, 211/126.9, 126.8, 85.4, 181.1; 99/416; 220/486

(56) References Cited

U.S. PATENT DOCUMENTS

| | | | | |
|---|---|---|---|---|
| 3,003,248 A | * | 10/1961 | Wittie | |
| 3,207,059 A | * | 9/1965 | Hirons | |
| 3,455,232 A | * | 7/1969 | Oliver | |
| 3,887,073 A | * | 6/1975 | Wilson | |
| 4,006,675 A | * | 2/1977 | Lill | |
| 4,854,227 A | * | 8/1989 | Koopman | 211/181.1 X |
| 5,205,208 A | * | 4/1993 | Gongwer | 211/181.1 X |
| 5,244,104 A | * | 9/1993 | Green et al. | 211/150 |
| 6,085,640 A | * | 7/2000 | King | |

\* cited by examiner

*Primary Examiner*—Robert W. Gibson, Jr.
(74) *Attorney, Agent, or Firm*—John R. Hoffman

(57) ABSTRACT

A wire form basket is provided for holding food products in a cooking apparatus. The basket includes a frame having a plurality of upright side walls defining a cooking space therewithin. A plurality of generally horizontal food-supporting shelves are vertically stacked in the space between the side walls, with one shelf above another shelf. The shelves are movable from horizontal food-supporting positions to generally vertical loading positions to allow food products to be loaded onto a given shelf without interference from any shelf above the given shelf.

28 Claims, 5 Drawing Sheets

FOOD PRODUCT COOKING BASKET

FIELD OF THE INVENTION

This invention generally relates to the art of food preparation and, particularly, to a basket for holding food products during cooking, such as a wire form basket for holding food products in a deep frying apparatus.

BACKGROUND OF THE INVENTION

Various types of containers or baskets are used for holding food products during cooking. For instance, wire form baskets are used for holding various types of food products, such as potatoes, pies, meat products and the like in a deep frying apparatus. Typically, the baskets are loaded with the bulk food products and are lowered into a reservoir of hot frying oil. In preparing french fried potatoes, for instance, a typical wire form basket simply is of an open-top structure, rectangular in configuration, and includes upright side walls about a bottom wall. One or more handles may be provided for manually or automatically lowering the wire form basket and food products into the hot frying oil.

Another type of food product prepared by deep frying apparatus is chicken filets. If the filets simply are deposited in a bulk-type basket as described above for potato products, the filets tend to curl-up during cooking. Such a product not only appears to be smaller in size, but the curled-up filets are difficult to use in sandwich products, such as in high volume restaurants or similar establishments. Even if the filets are arranged on a flat support, the filets still have a tendency to curl-up during cooking. The present invention is directed to solving these various problems, and providing a basket for holding food products in a unique movable shelf system.

SUMMARY OF THE INVENTION

An object, therefore, of the invention is to provide a new and improved container or basket for preparing food products.

Another object of the invention is to provide a new and improved wire form basket for holding food products in a cooking apparatus, such as a deep frying apparatus.

In the exemplary embodiment of the invention, the basket includes a wire form frame having a plurality of upright side walls defining a frying space therewithin. A plurality of generally horizontal food-supporting shelves are vertically stackable in the space between the side walls, with one shelf on top of another shelf. Complementary interengaging mounting means are provided between at least some of the shelves and the frame to provide for moving the shelves from horizontal food-supporting positions to generally vertical loading positions to allow food products to be loaded onto a given shelf without interference from any shelf above the given shelf.

As disclosed herein, the shelves are fabricated in wire form. The frame has an open top and open front and includes a bottom wall defining a fixed food-supporting shelf above which the movable shelves are stacked.

Generally, the complementary interengaging mounting means include pivot means to provide for pivoting of the shelves between their positions. Slide means are provided for sliding the shelves to clear other shelves already moved to their loading positions. The pivot means is part of the slide means. In particular, the shelves have pivot pins at opposite sides thereof that extend into generally horizontal grooves on the side walls of the frame. The pivot pins allow the shelves to pivot to upright positions, while the grooves allow the shelves to move horizontally forward during pivoting to clear the shelves which already have been moved to their vertical loading positions.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
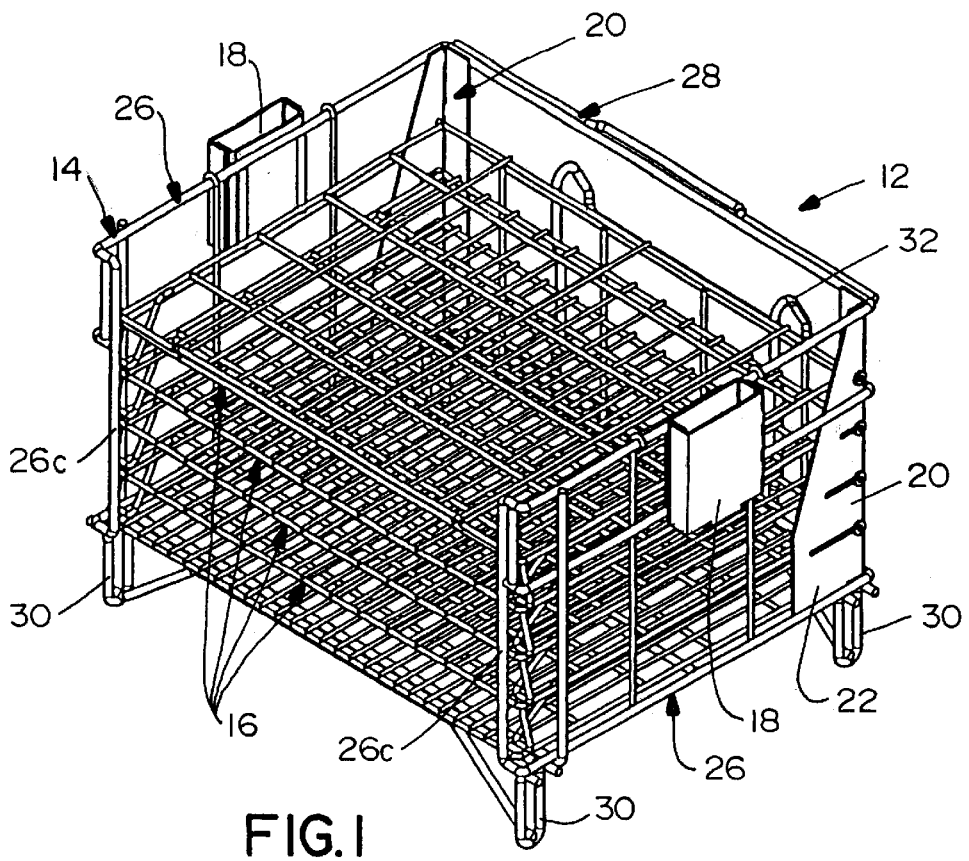
FIG. 1 is a front/top perspective view of a wire form basket incorporating the concepts of the invention.
Figure 2:
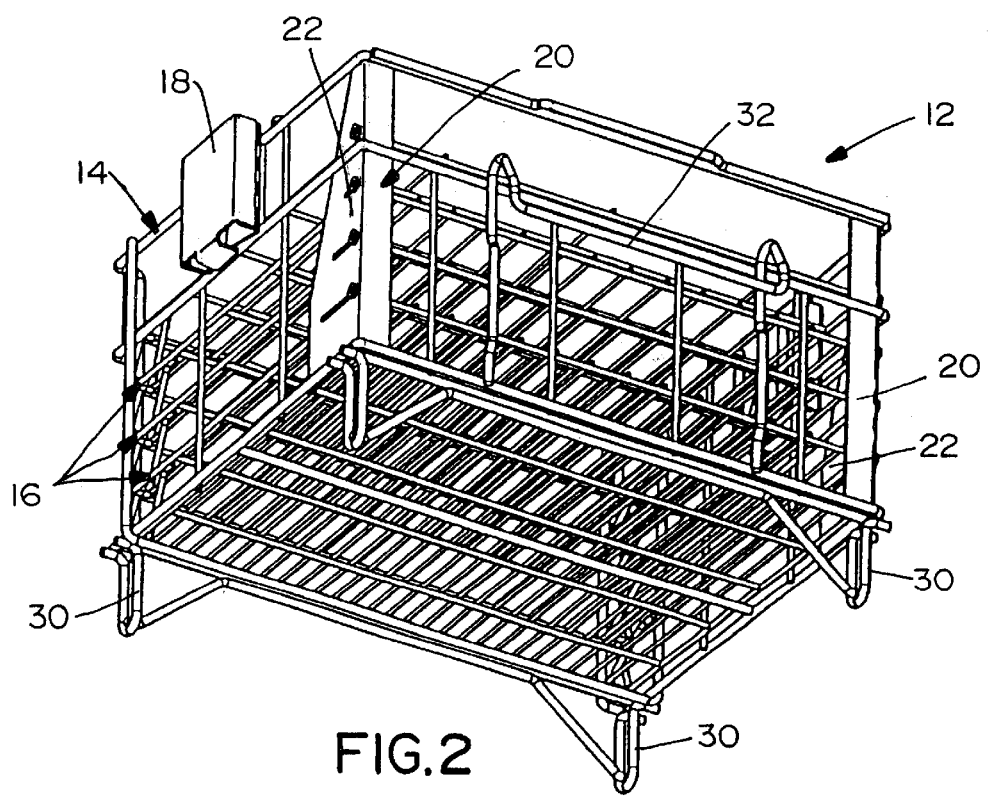
FIG. 2 is a rear/bottom perspective view of the basket.

Referring to the drawings in greater detail, and first to FIGS. 1–4, the invention is embodied in a wire form basket, generally designated 12, which is used for holding food products in a food cooking apparatus, such as a deep frying apparatus having a reservoir of cooking oil. Basket 12 generally includes a wire form frame, generally designated 14, and a plurality of stackable wire form shelves, generally designated 16. A pair of stamped and formed sheet metal brackets 18 are fixed to opposite sides of the basket for facilitating lowering the basket into a reservoir of frying oil to cook the food products and to lift the basket out of the oil and allow the products to drain. As will be described in detail hereinafter, complementary interengaging mounting means, generally designated 20, and including a pair of horizontally slotted sheet metal plates 22, are provided between frame 14 and shelves 16 at the rear corners of basket 12 to provide for moving the loaded onto a given shelf without interference from any shelf above the given shelf.

Figure 5:
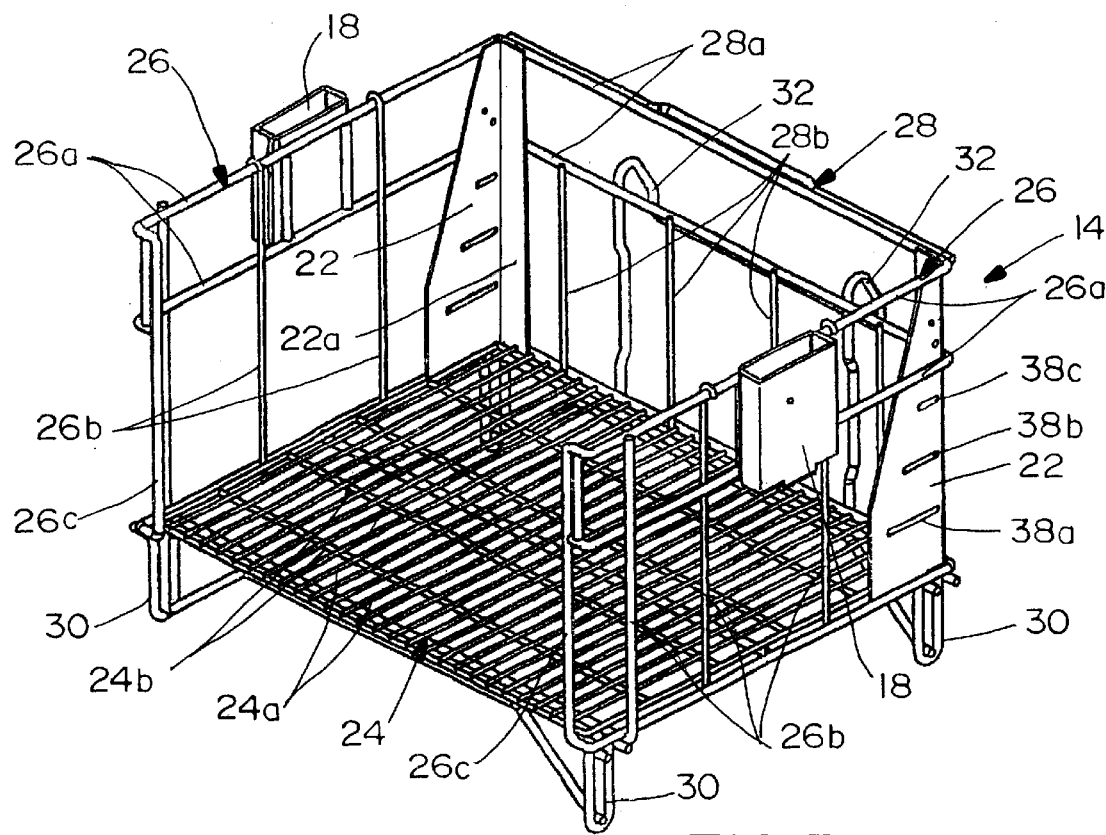
FIG. 5 is a perspective view of the wire form frame of the basket.
Figure 6:
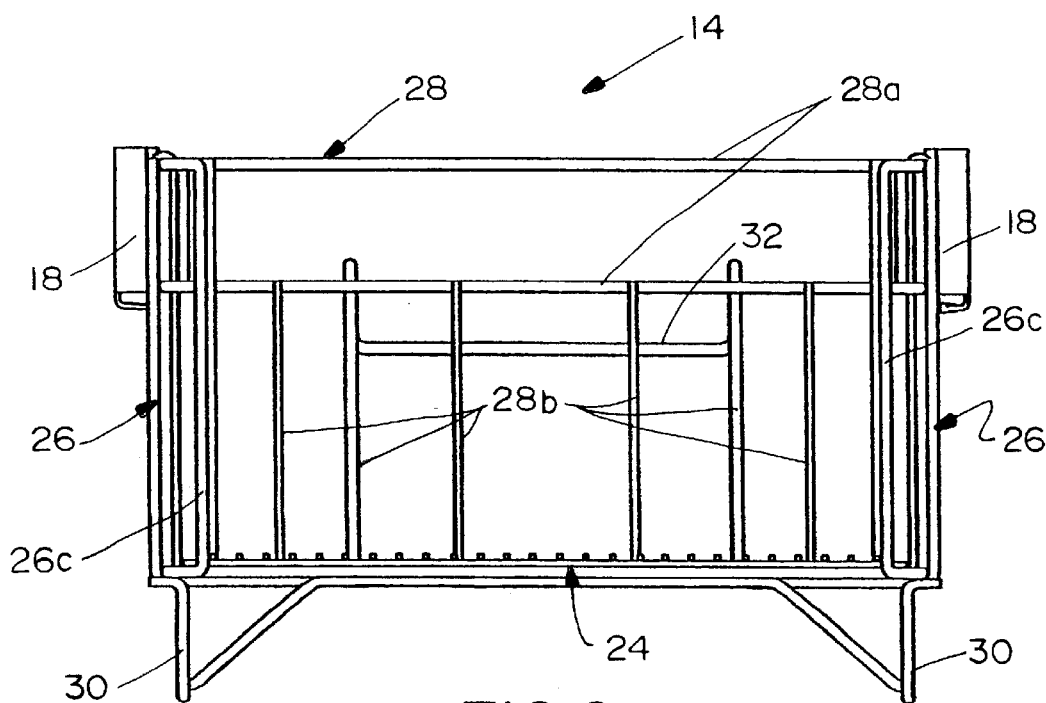
FIG. 6 is a front elevational view of the frame.
Figure 7:
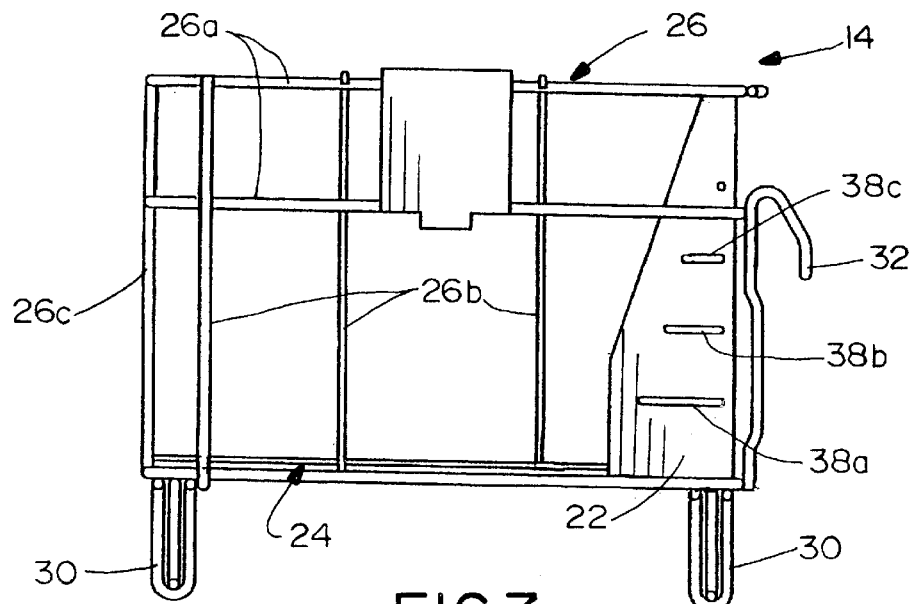
FIG. 7 is a side elevational view of the frame.

Referring to FIGS. 5–7 in conjunction with FIGS. 1–4, wire form frame 14 includes a bottom wall, generally designated 24, end side walls, generally designated 26, and a rear side wall, generally designated 28. The three side walls extend upright from the bottom wall to define an open-top/open-front structure. The bottom wall and side walls all are of wire form construction. In particular, the bottom wall includes front-to-rear wires or rods 24a joined to transverse rods 24b to form a grid which is sufficiently dense to provide a support structure on top of which food products, such as chicken filets or the like, can be arranged. End side walls 26 include horizontal rods 26a joined to vertical rods 26b. The front corners of end side walls 26 are turned inwardly to vertical rods 26c. Rear side wall 28 includes horizontal rods 28a and vertical rods 28b. Brackets 18 are fixed to the rods of end side walls 26 on the outsides thereof. Slotted plate 22 is fixed to the rods of the end side walls on the insides thereof. The slotted plates include flanges 22a which are fixed to the vertical rods of rear wall 28. In other words, the slotted plates are L-shaped in horizontal section and are fixed within the basket at the inside corners or junctures of end side walls 26 and rear side wall 28.

Still referring to FIGS. 5–7 in conjunction with FIGS. 1–4, wire form frame 14 includes four wire form legs 30 at the four corners thereof fixed to and projecting downwardly from bottom wall 24. The legs allow the basket to be supported on a surface, such as a countertop, for loading the basket with food products. A pair of wire form hooks 32 are fixed to the horizonal rods of rear wall 28 at the rear of the basket. The hooks allow the basket to be hung from an appropriate support structure above the reservoir of cooking oil so that excess oil can drain or drip from the food products as well as from the basket, itself.

Figure 3:
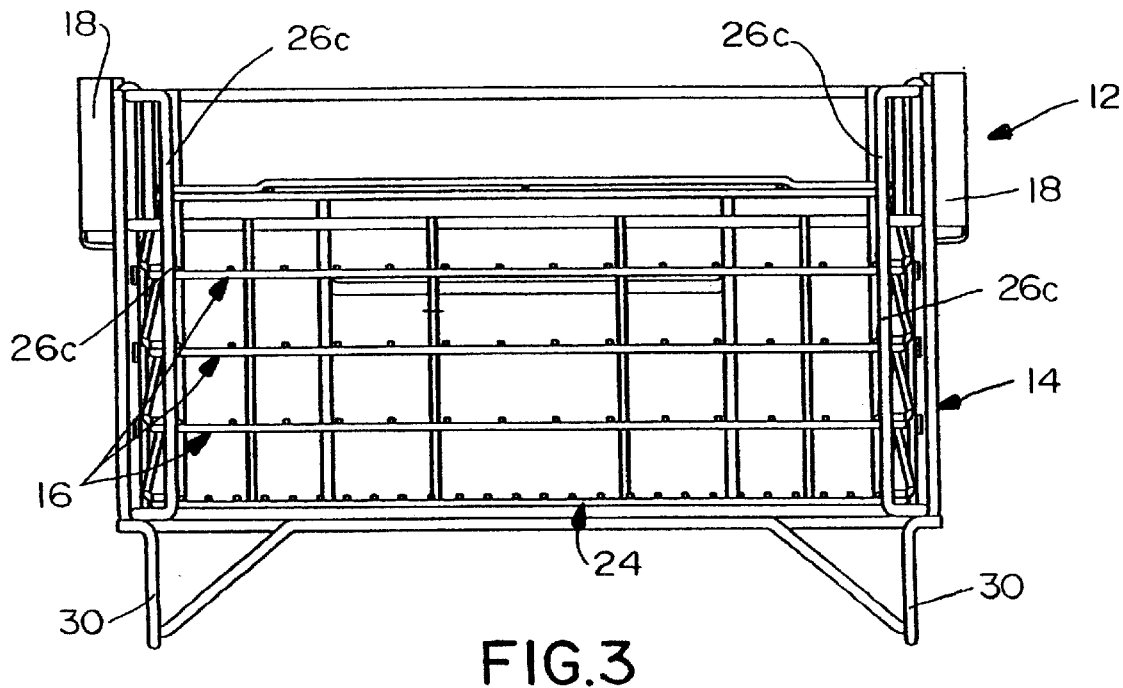
FIG. 3 is a front elevational view of the basket.
Figure 4:
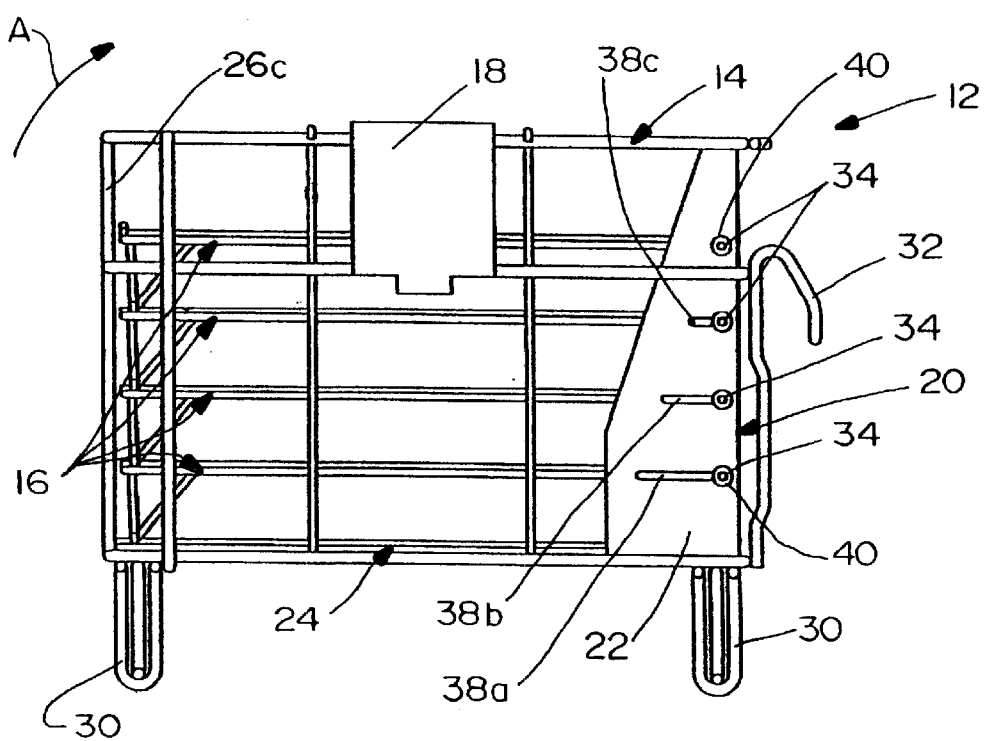
FIG. 4 is a side elevational view of the basket.
Figure 8:
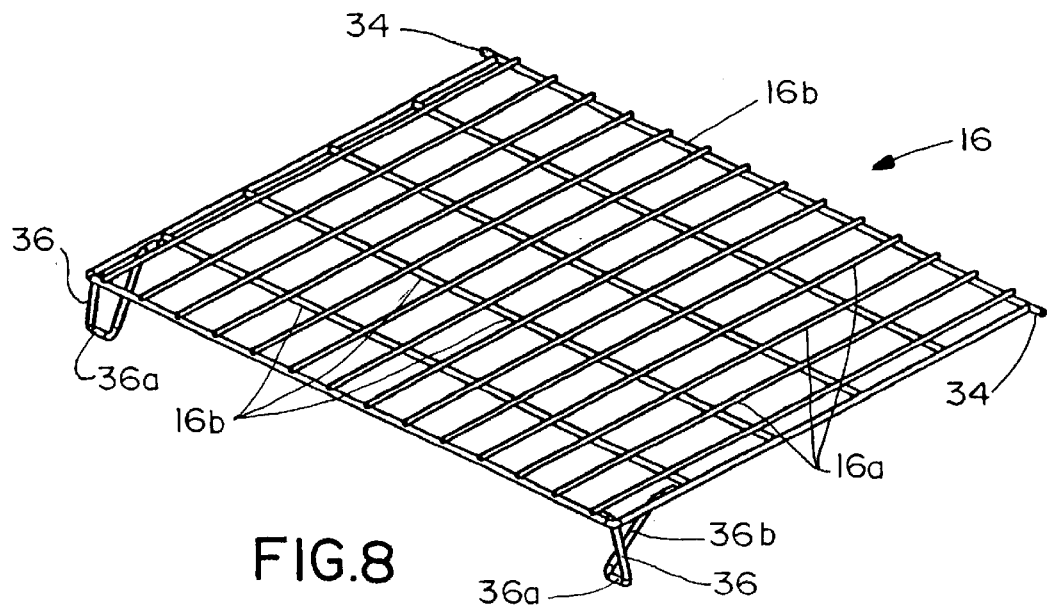
FIG. 8 is a perspective view of one the shelves of the basket.
Figure 9:
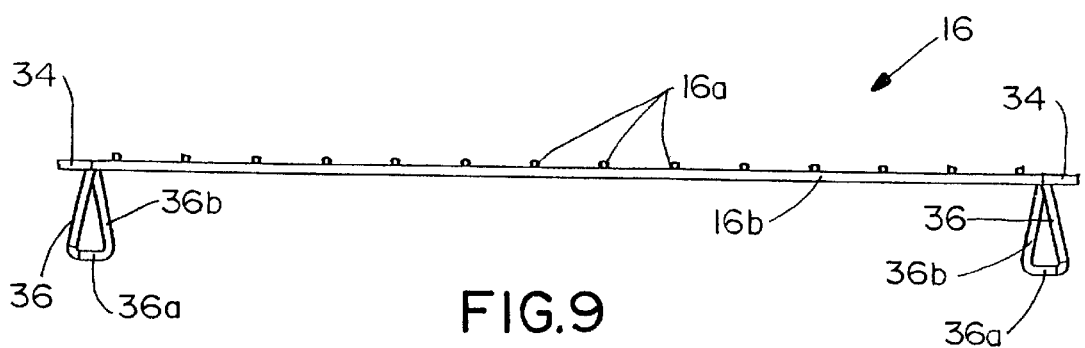
FIG. 9 is a front elevational view of the shelf.
Figure 10:
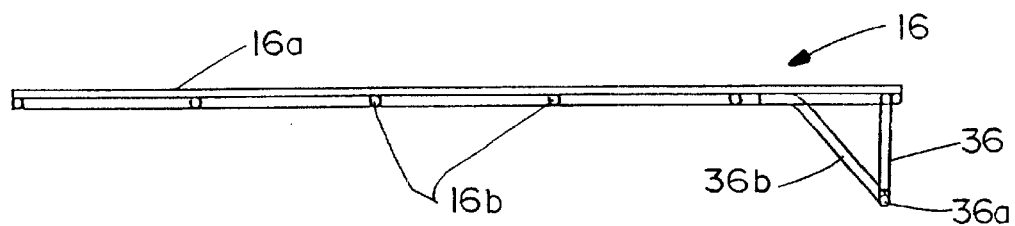
FIG. 10 is a side elevational view of the shelf.

Referring to FIGS. 8–10 in conjunction with FIGS. 1–4, one of the movable shelves 16 is shown. Each shelf is of a wire form construction including a plurality of front-to-rear wires or rods 16a joined to a plurality of transverse rods 16b to form a grid upon which the food products, such as chicken filets, are arranged for frying. It should be noted that the rear-most transverse rod 16a projects beyond the sides of the shelf to form pivot pins 34. A pair of wire form legs 36 project downwardly from the front corners of the shelf and terminate in a bottom rod section defining a horizontal platform 36a. The platform is sufficiently wide so that the shelves are stackable above bottom wall 24 of wire form frame 14, with the platforms of the shelves resting either on the extreme outside front-to-rear rods 24a of the bottom wall or on the extreme outside front-to-rear rods 16a of subjacent shelves. In other words, as best seen in FIGS. 1 and 3, a bottom shelf 16 is stacked on bottom wall 24 of the wire form frame, and three additional shelves 16 are stacked on top of the bottom shelf. Each leg 36 of each shelf also has a rearwardly extending angled brace portion 36b which defines a ramp. It can be seen that the ramps are on the insides of the legs. Therefore, the ramps of one shelf are engageable with the front edge of a subjacent shelf when the shelves move or pivot up and down as described below.

Referring back to FIG. 4, it can be seen that each slotted plate 22 has a series of horizontal slots 38a, 38b and 38c. Slot 38a is in line with the bottom shelf 16. Slot 38b is in line with the shelf immediately above the bottom shelf. Slot 38c is in line with the next stacked shelf.

Pivot pins 34 of the three lower shelves extend into slots 38a–38c, and the pivot pins for the top shelf extend into holes (not visible) in slotted plates 22. Enlargements 40 are secured to the extreme distal ends of pivot pins 34 on the outsides of the slotted plates. Therefore, the pivot pins extend through the slotted plates to provide for pivoting of shelves 16 from their food-supporting positions shown in FIG. 4, in a direction indicated by arrow "A", upwardly to generally vertical loading positions shown in FIG. 11.

Figure 11:
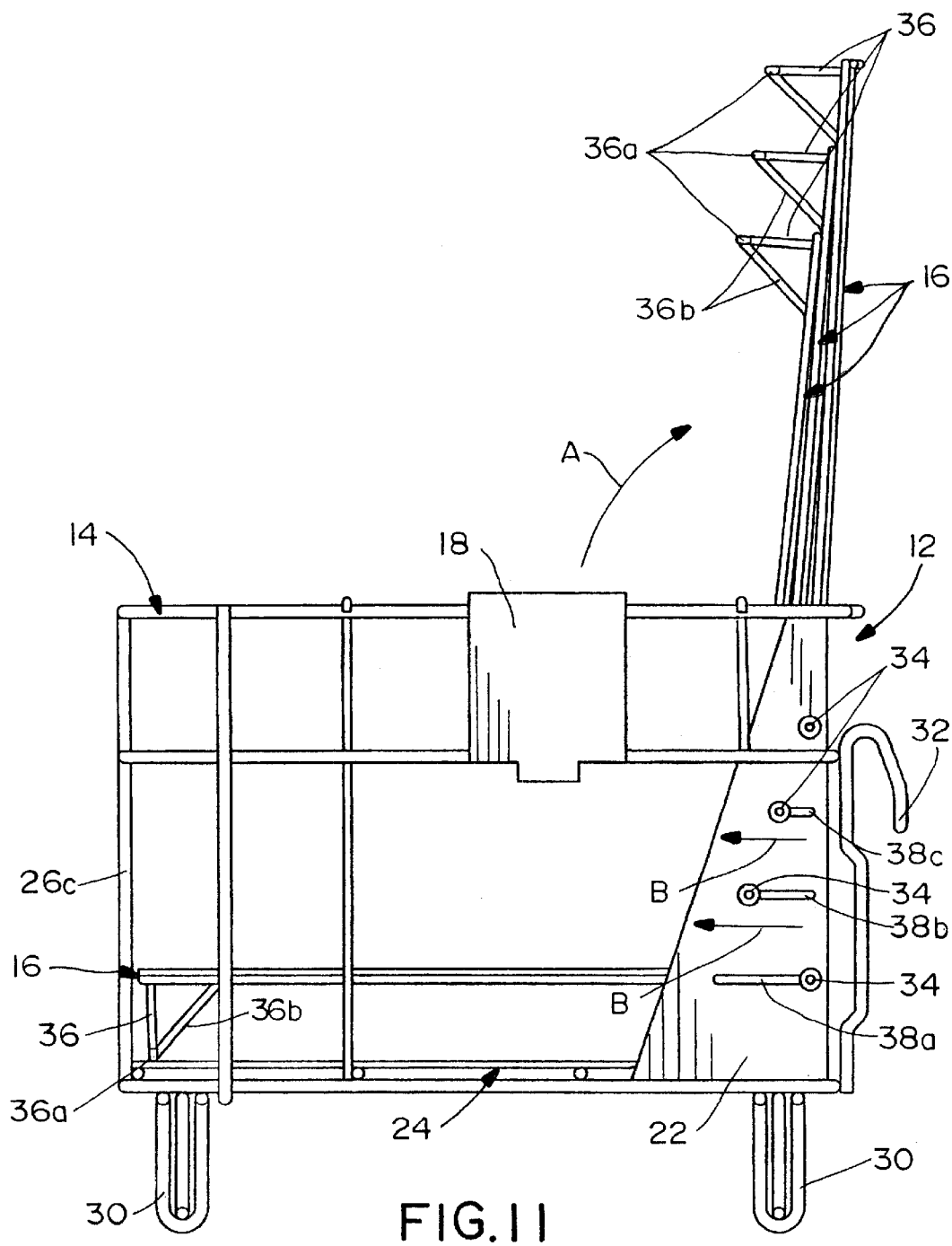
FIG. 11 is a side elevational view of the basket, with the bottom shelf in its horizontal food-supporting position and the remaining shelves pivoted to their vertical loading positions.

Referring specifically to FIG. 11, it can be seen that the three upper shelves 16 have been pivoted upwardly in the direction of arrow "A" to their generally vertical loading positions, while the bottom shelf 16 remains stacked and supported on top of bottom wall 24 of wire form frame 14. During this action, the very top shelf simply pivots upwardly about its pivot pins 34. However, it can be seen that pivot pins 34 of the two intermediate shelves have moved forwardly in the direction of arrows "B",within slots 38b and 38c of slotted plate 32. This allows the rear edges of the shelves to move forwardly so that the shelves can clear the previously raised shelves. As seen clearly in FIG. 11, the slots increase in length downwardly along slotted plate 22. This increasing length is required because the lower shelves must clear more upper shelves as the shelves are progressively pivoted upwardly. In other words, the second shelf from the top must clear only the top shelf. However, the next shelf having pivot pins 34 in slots 38b must clear both of the shelves thereabove. Slots 38a for the bottom shelf are the longest slots, because the bottom shelf must clear all of the shelves thereabove.

In operation, and still referring to FIG. 11, wire form basket 12 is loaded by first pivoting all shelves 16 upwardly to their generally vertical loading positions. All of the shelves can be pivoted upwardly simply by lifting on the bottom shelf. The shelves remain in their upper or loading positions of FIG. 11, because the shelves move "over-center" the pivots thereof as defined by pins 34. This allows food products, such as chicken filets, to be easily and neatly arranged on top of bottom wall 24 of the wire form frame of the basket. After the bottom wall is loaded with the food products, the bottom shelf 16 is lowered to the position shown in FIG. 11, with platforms 36a of legs 36 of the bottom shelf resting on top of bottom wall 24. It can be seen that pivot pins 34 for the bottom shelf have been moved to the rear of slots 38a. The bottom shelf now can be easily loaded with the food products. Once the bottom shelf is loaded, the next shelf having pivot pins 34 within slots 38b is lowered or stacked onto the bottom shelf, and it is loaded with food products. This procedure is continued until all of the shelves are sequentially lowered and loaded with food products, whereupon the entire loaded basket can be lowered into the reservoir of frying oil. Without being able to pivot the shelves upwardly, it would be physically impossible to completely load the shelves with food products without having to push the food products against each other toward the rear of the shelves. This would cause disfiguration of the food products, particularly thin and soft products such as chicken filets.

Finally, it should be noted that legs 36, including platforms 36a, have vertical lengths to space shelves 16 relative to each other and relative to bottom wall 24 so that the food products do not unnecessarily curl during cooking. For chicken filets, for instance, the spacing may be on the order of 1.25 inches between the shelves to prevent unnecessary curling of the filets. Therefore, such filets may not be positioned on the top shelf, and the top shelf may be provided simply as a hold-down structure, with the filets being loaded on bottom wall 24 of the wire frame and only on the three lower shelves.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A wire form basket for holding food products in a deep frying apparatus, comprising:
   a wire form frame including a plurality of upright side walls defining a frying space therewithin;
   a plurality of generally horizontal food-supporting shelves vertically stackable in said space between the side walls, with one shelf above another shelf; and
   complementary interengaging mounting means between at least some of the shelves and the frame to provide for moving the at least some shelves from horizontal food-supporting positions to generally vertical loading positions to allow food products to be loaded onto a given shelf without interference from any shelf above the given shelf, said complementary interengaging mounting means including slide means to provide for sliding of said at least some shelves to clear other shelves already moved to their vertical loading positions.

2. The wire form basket of claim 1 wherein said shelves are fabricated in wire form.

3. The wire form basket of claim 1 wherein said wire form frame includes a bottom wall defining a fixed food-supporting shelf above which said movable shelves are stacked.

4. The wire form basket of claim 1 wherein said complementary interengaging mounting means include pivot means to provide for pivoting of said at least some shelves between said positions.

5. The wire form basket of claim 1 wherein said complementary interengaging mounting means include pivot means to provide for pivoting of said at least some shelves between said positions.

6. The wire form basket of claim 5 wherein said pivot means comprises at least part of said slide means.

7. The wire form basket of claim 6 wherein said complementary interengaging mounting means include pivot pins on said at least some shelves extending into generally horizontal grooves on the side walls of the frame.

8. A wire form basket for holding food products in a cooking apparatus, comprising:
   a wire form frame including a plurality of upright side walls defining a cooking space therewithin;
   a plurality of generally horizontal food-supporting shelves vertically spaced in the space between the side walls, with one shelf above another shelf; and
   complementary interengaging mounting means between at least some of the shelves and the frame to provide for moving the at least some shelves from horizontal food-supporting positions to generally vertical loading positions to allow food products to be loaded onto a given shelf without interference from any shelf above the given shelf, said complementary interengaging mounting means including slide means to provide for sliding of said at least some shelves to clear other shelves already moved to their vertical loading positions.

9. The wire form basket of claim 8 wherein said shelves are fabricated in wire form.

10. The wire form basket of claim 8 wherein said wire form frame includes a bottom wall defining a fixed food-supporting shelf above which said movable shelves are disposed.

11. The wire form basket of claim 8 wherein said complementary interengaging mounting means include pivot means to provide for pivoting of said at least some shelves between said positions.

12. The wire form basket of claim 8 wherein said complementary interengaging mounting means include pivot means to provide for pivoting of said at least some shelves between said positions.

13. The wire form basket of claim 12 wherein said pivot means comprises at least part of said slide means.

14. The wire form basket of claim 13 wherein said complementary interengaging mounting means include pivot pins on said at least some shelves extending into generally horizontal grooves on the side walls of the frame.

15. A basket for holding food products in a deep frying apparatus, comprising:
   a frame including a plurality of upright side walls defining a frying space therewithin;
   a plurality of generally horizontal food-supporting shelves vertically stackable in said space between the side walls, with one shelf above another shelf; and
   complementary interengaging mounting means between at least some of the shelves and the frame to provide for moving the at least some shelves from horizontal food-supporting positions to generally vertical loading positions to allow food products to be loaded onto a given shelf without interference from any shelf above the given shelf, said complementary interengaging mounting means including slide means to provide for sliding of said at least some shelves to clear other shelves already moved to their vertical loading positions.

16. The basket of claim 15 wherein said frame includes a bottom wall defining a fixed food-supporting shelf above which said movable shelves are disposed.

17. The basket of claim 15 wherein said complementary interengaging mounting means include pivot means to provide for pivoting of said at least some shelves between said positions.

18. The basket of claim 15 wherein said complementary interengaging mounting means include pivot means to provide for pivoting of said at least some shelves between said positions.

19. The basket of claim 18 wherein said pivot means comprises at least part of said slide means.

20. The basket of claim 19 wherein said complementary interengaging mounting means include pivot pins on said at least some shelves extending into generally horizontal grooves on the side walls of the frame.

21. A wire form basket for holding food products in a deep frying apparatus, comprising:
- a wire form frame including a bottom food-supporting wall, a plurality of upright side walls defining a frying space therewithin, an open front and an open top;
- a generally horizontal food-supporting shelf spaced vertically above said bottom wall; and
- complementary interengaging mounting means between the shelf and the frame to provide for moving the shelf from a horizontal food-supporting position and a generally vertical loading position to allow food products to be loaded onto the bottom wall without interference from the shelf, said complementary interengaging mounting means including slide means to provide for sliding of said second shelf to clear the first shelf when already moved to its vertical loading position.

22. The wire form basket of claim 21 wherein said shelf is fabricated in wire form.

23. The wire form basket of claim 21 wherein said complementary interengaging mounting means include pivot means to provide for pivoting of the shelf between said positions.

24. The wire form basket of claim 21 wherein said shelf comprises a first shelf, and including a second, generally horizontal food supporting shelf spaced vertically above the first shelf.

25. The wire form basket of claim 24 wherein said complementary interengaging mounting means include pivot means to provide for pivoting of said shelves between said positions.

26. The wire form basket of claim 21 wherein said complementary interengaging mounting means include pivot means to provide for pivoting of said shelves between said positions.

27. The wire form basket of claim 26 wherein said pivot means comprises at least part of said slide means.

28. The wire form basket of claim 27 wherein said complementary interengaging mounting means include pivot pins on said shelves, with the pivot pins of the first shelf extending into horizontal grooves on the side walls of the frame.

* * * * *